United States Patent [19]

Fechter

[11] 4,175,145

[45] Nov. 20, 1979

[54] MAKING MEMORY STRUCTURE FOR LASER RECORDING SYSTEM

[75] Inventor: Henry G. Fechter, Skokie, Ill.

[73] Assignee: Teletype Corporation, Skokie, Ill.

[21] Appl. No.: 917,128

[22] Filed: Jun. 19, 1978

Related U.S. Application Data

[60] Division of Ser. No. 770,244, Feb. 18, 1977, abandoned, which is a continuation of Ser. No. 572,482, Apr. 28, 1975, abandoned.

[51] Int. Cl.² .......................... B05D 1/38; B05D 5/00
[52] U.S. Cl. ................................ 427/240; 346/135.1; 427/407 R; 427/409; 428/217; 428/409; 428/425
[58] Field of Search ...................... 118/52, 53, 54, 56; 427/240, 162, 402, 407, 409; 96/1.5 R

[56] References Cited

U.S. PATENT DOCUMENTS

| | | | |
|---|---|---|---|
| 2,833,680 | 5/1958 | Kneeling | 118/52 X |
| 3,343,145 | 9/1967 | Bertelsen | 428/900 X |
| 3,499,783 | 3/1970 | Nelson et al. | 428/425 X |

Primary Examiner—Morris Kaplan
Attorney, Agent, or Firm—A. A. Tirva; J. C. Albrecht

[57] ABSTRACT

In laser recording systems, data is written in a thermoplastic medium and a smooth surface of the medium is critical for high quality operation of the system. This smooth recording surface is provided by spin coating the supporting substrate, which may be an unpolished metal, with an intermediate layer of thermosetting material which is nonconformal in nature. The thermoplastic medium which is conformal in nature is then spin coated onto the smooth surface provided by the intermediate layer to form a microscopically smooth conformal layer.

1 Claim, 6 Drawing Figures

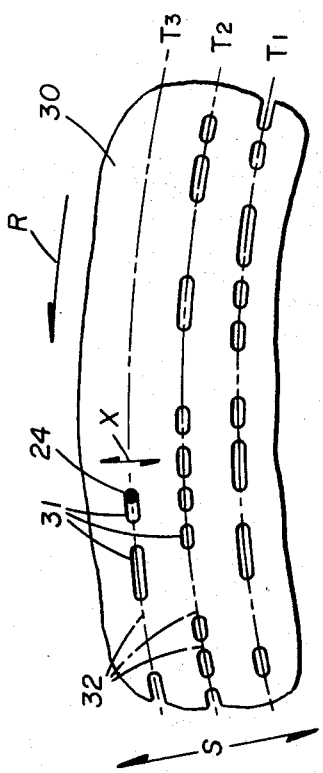
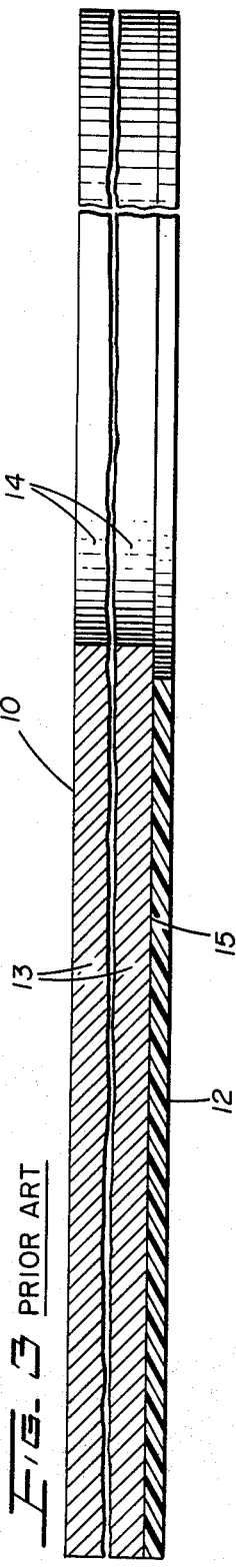
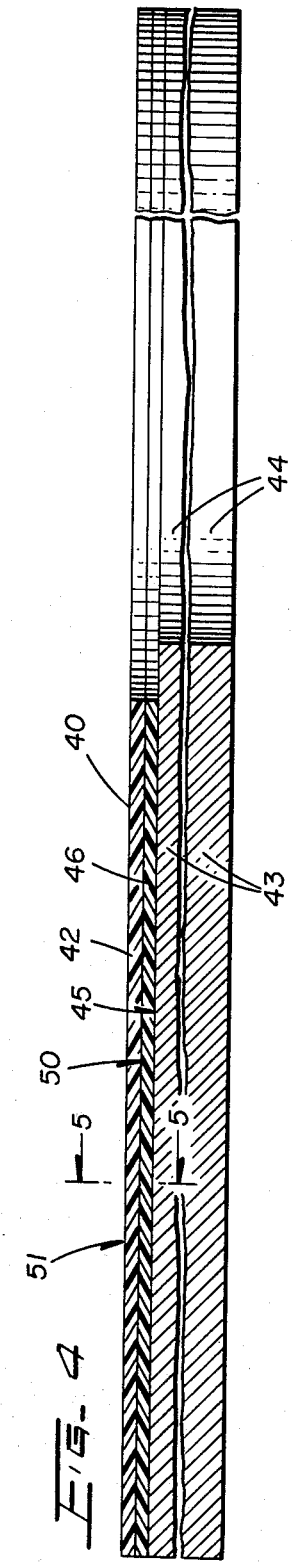

MAKING MEMORY STRUCTURE FOR LASER RECORDING SYSTEM

This is a division, of application Ser. No. 770,244 filed Feb. 18, 1977, now abandoned, which was a continuation of application Ser. No. 572,482, filed Apr. 28, 1975, now abandoned.

This invention relates to a data storage system in which information is recorded in a memory structure by forming discrete deformations in a thermoplastic medium by the use of a high intensity source of electromagnetic energy, and more particularly, to the memory structure and method for making the structure.

Systems using a laser beam, for example, to write data in a thermoplastic medium are generally known, and various features of such systems are disclosed, in particular, in U.S. Pat. Nos. 3,262,122 to H. Fleischer, et al., 3,475,760 to C. O. Carlson, 3,815,146 to L. A. Nash, and 3,825,323 to D. C. Landwer, and these patents are incorporated by reference herein. In the laser writing process, the laser beam is focused on the thermoplastic medium to form a minute depression in the surface of the thermoplastic. By moving the surface relative to the focused beam spot, a series of depressions or grooves are formed along a path or track. In this manner, digital data can be encoded by forming a groove or leaving the surface flat at each location along the track, corresponding respectively, for example, to digital 1's and 0's. The thermoplastic medium can be in the form of a tape or ribbon, but it is often placed upon the surface of a drum or disc. Notwithstanding the physical arrangement, this laser recording technique is capable of recording vast amounts of information per unit area of thermoplastic surface because of the small size of the focused beam; for example, in one recent application more than 10,000,000 bits of binary data have been recorded per square inch of recording surface.

The data may be read from the surface in various ways such as by measuring the reflectivity from the encoded surface when illuminated by a low power laser beam. Details of the reading process are disclosed in a copending application of C. A. Glorioso, Ser. No. 530,887, filed Dec. 9, 1974, now U.S. Pat. No. 3,983,317, and assigned to assignee hereof.

The thermoplastic medium is conventionally placed upon a metallic substrate which exhibits a high melting point relative to the thermoplastic, and aluminum is commonly used especially where the substrate is a flat circular disc. Conventionally, the aluminum is highly polished and a thin layer of thermoplastic material is applied to the polished surface to form a layer of uniform thickness which conforms to the surface of the substrate. The thickness is chosen in each case in accordance with the type of laser being used so that adequately detectable grooves are produced.

The quality of writing is dependent upon the precise amount of energy absorbed by the thermoplastic when the laser beam is focused thereon. It has been found preferably to increase the absorption by dying the thermoplastic with a color complimentary to the laser beam color, but the depth of focus is also critical to the writing process. Therefore, efforts have been made to assure that the surface of the thermoplastic is uniformly smooth. Accordingly, the surface of the substrate is normally highly polished before the conformal layer of thermoplastic is applied.

Unfortunately, achieving the highly accurate dimensions required to write precisely located microscopic grooves is impaired by the characteristics of the metallic substrate. Even very costly polishing techniques leave microscopic imperfections or roughness on the aluminum surface. This causes the thermoplastic layer to exhibit corresponding roughness which, in turn, results in the writing laser beam being slightly out of focus in the vicinity of the roughness. This roughness also has an adverse effect upon the reading process by causing background scattering which lowers the signal-to-noise ratio received by the detector. In addition, the aluminum substrate dissipates heat during the writing process, and as higher intensities of energy are used in the writing process to compensate for the dissipated energy, the precision of the data is impaired by a spreading or diffusion of the edges of the grooves.

The substrate also contains large-scale surface variations or undulations which are reproduced in the thermoplastic surface. These variations generally occur over an area large relative to the size of the groove and therefore mechanical compensation, such as the depth of focus adjustment disclosed in the aforementioned Landwer patent is adequate. However, the mechanical correction cannot compensate for the microscopic variations or roughness derived from the substrate surface.

It is therefore an object of the present invention to provide an improved thermoplastic memory structure.

It is a particular object of the invention to provide a thermoplastic medium having an accurately controlled surface.

It is an additional object to provide a thermoplastic memory structure which will provide high quality writing with reduced laser energy.

It is a further object to provide a thermoplastic memory structure which will dissipate less heat during the writing process.

It is a still further object to provide a thermoplastic memory structure which yields a high signal-to-noise ratio when reading data from the thermoplastic medium.

SUMMARY OF THE INVENTION

In accordance with the present invention, a thermoplastic memory is formed by depositing two layers of material upon a metallic substrate such as aluminum. The first or preliminary layer is a nonconformal layer and a dyed conformal thermoplastic layer is applied over the preliminary layer. This outer thermoplastic layer performs as in the preexisting systems, but since the preliminary layer is nonconformal, it provides a smooth, intermediary surface upon which the thermoplastic layer is placed. Thus without the costly polishing of the substrate the surface of the thermoplastic layer is smooth notwithstanding the substrate's roughness.

Since the thermoplastic surface is smooth, many of the problems caused by surface imperfections are eliminated. In particular, the depth of focus during the writing process is nearly constant, and the signal-to-noise ratio is improved by the reduction of the background light scattering. The preliminary layer also provides thermal insulation of the substrate which results in improved writing since very little writing energy is dissipated in the substrate.

An additional improvement can be provided by using an efflorescent material as the outer thermoplastic layer. This material will form bubbles in the interior surface of the grooves and will therefore produce a much higher signal-to-noise ratio when detected than would be provided by the smooth interior surfaces of the grooves formed in conventionally used thermoplastics.

BRIEF DESCRIPTION OF THE DRAWINGS

FIG. 2 is a greatly exaggerated, fragmentary view of a portion of the recording surface shown generally within region 30, in FIG. 1.

FIG. 3 is a cross-section of the conventional storage structure such as would be employed in the system of FIG. 1.

FIG. 4 is a cross-sectional view of a storage structure in accordance with the present invention.

DETAILED DESCRIPTION

Background—General Recording and Reproducing Process

Figure 1:
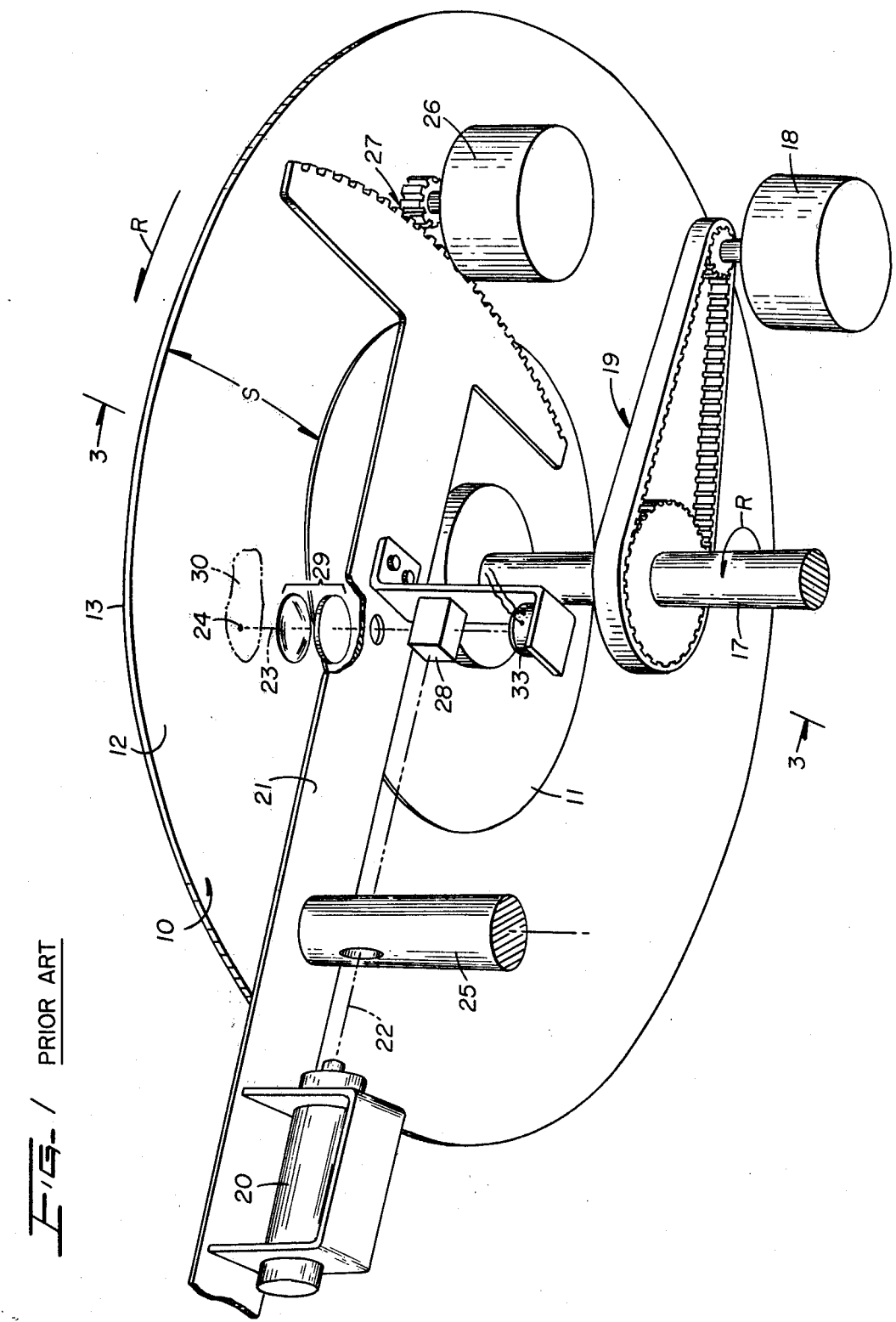
FIG. 1 is a generalized perspective view of a laser-driven thermoplastic memory storage system of the conventional type.

FIG. 1 illustrates a representative laser memory system for recording and reproducing data. The basic arrangement and operation of the apparatus is disclosed in the patents to Fleischer et al., Carlson, Nash, and Landwer, and the application of Glorioso identified hereinbefore. In summary, both the recording (writing) and reproducing (reading) processes preferably utilize a record or disc 10 detachably mounted on a turntable 11. The record 10 includes a thin, thermoplastic layer 12 applied to the under surface of a very flat-surfaced backing disc or substrate 13 of a high melting point material, such as, for example, aluminum, lastic, glass, or ceramic. The thermoplastic layer 12, which constitutes the recording medium, may be an acrylic resin, or any of various other thermoplastic materials such as are mentioned in the Fleischer et al. or Carlson patents. Preferably the thermoplastic is dyed a color complementary to the laser radiation in order to increase the absorption coefficient of the thermoplastic for the frequency of the laser beam applied during the writing process.

The turntable 11 includes a flat disc or platform above which the record 10 is received in a precise horizontal plane, and a shaft 17 for rotating the turntable 11 and the associated record 10 (indicated by arrows R) by a constant speed drive motor 18 through any conventional drive mechanism, such as a sprocket and belt transmission 19. A recording arm 21 is positioned below the turntable 11 and parallel to the record 10, somewhat similar in arrangement to a standard phonograph recording arm. The arm 21 carries a laser assembly 20 which produces a beam 22 and an optical system which reflects and focuses the beam 22 to form a focused beam 23 on a small spot 24 of the recording surface S of the thermoplastic layer 12.

The recording arm 21 is mounted on a shaft 25 parallel to the turntable shaft 17. In the example illustrated, the shaft 25 is affixed to the arm 21 and is rotatable in a bushing, not shown. Thus, the arm 21 may be pivoted when desired by a conventional, reversible drive motor 26 through an appropriate mechanism such as a gear drive system 27. With this arrangement, the focused spot 24 can be made to traverse the recording surface S of the record 10 in a generally conventional fashion so as to form a spiral recording track around the record 10. Alternately, the arm 21 can be stepped along the surface of the record 10 to preselected positions so as to form a plurality of concentric recording tracks upon which the focused spot 24 falls.

Portions of three adjacent tracks, which may be concentric tracks or parts of a single spiral track, assumed to be within region 30 in FIG. 1, are designated $T_1$, $T_2$, and $T_3$, and are shown in greater detail in FIG. 2. In the recording mode, the beam 22 from the laser assembly 20 is a high intensity beam which is modulated "ON" and "OFF" in accordance with the input data. This modulated beam is reflected by a beam splitter 28 into a lens assembly 29 (the housing of which is not shown) which forms high intensity laser beam 23 focused on the thermoplastic layer 12 at spot 24. When the beam 23 is "ON" the focused spot 24 causes a localized absorption of laser energy into the thermoplastic layer 12. This would form a circular depression in a stationary surface S. However, due to the rotational movement of record 10, the essentially round circular spot 24 actually causes elongated grooves such as 31 in the layer 12. When the beam is "OFF," untouched, flat areas or lands 32 are left between the grooves 31. As used herein, "OFF" simply means that the intensity of the laser beam is insufficient to raise the temperature of the thermoplastic to its softening (or glass transition temperature point, $T_9$).

To reproduce or read previously recorded information, the record 10 is preferably mounted on the same rotating turntable 11. A desired track T is selected by activating the stepping motor 26. A special "reading" beam, which is a low intensity nondestructive laser beam generated by the laser assembly 20, is focused by the beam and the lens assembly 29 on the selected track T. The light energy from this reading beam is reflected back by the surface S, and passed by the beam splitter 28 to the photocell 33. Since the amount of energy reflected by a groove 31 differs significantly from the amount of energy reflected by the lands 32, the output of the detecting photocell 33 can be converted by conventional circuitry to a binary data signal corresponding to the data recorded on the disc 10.

The Memory Structure

In the system of FIG. 1 the disc 10 is the memory structure. As can be seen in FIG. 3, which shows a partial cross-section of the disc 10, the substrate 13 contains a large central hole 14, and an operative surface 15 (facing downward when positioned on turntable 11) is coated with a layer 12 of thermoplastic. Conventionally, the thermoplastic layer is very thin, ranging from about 0.0002 inches (approximately 0.00508 mm) to about 0.0005 inches (approximately 0.01278 mm) and is applied essentially over the entire surface 15 from the central hole 14 to the periphery by spin-coating a fast-setting liquid thermoplastic on the surface 15. This spin-coating process, of course, requires that the substrate 13 be reversed from its "upside-down" position in FIG. 3 so that the surface 15, which is being coated, is the top surface of the substrate.

The substrate 13 is most conventionally aluminum, glass or ceramic, and it is highly polished, to provide a very smooth surface 15 since the layer 12 is inherently conformal and the recording surface S reproduces the topography of the substrate surface 15. It has been found, however, that the polishing does not provide completely satisfactory results, because, as was discussed hereinbefore, microscopic imperfections in the surface 15 persist after polishing. These microscopic imperfections cause the depth of layer 12 to vary at the location of a particular groove 31 resulting in variation of the depth of focus and consequently poor writing. They also cause unwanted light scattering which affects the reflection of light and hence reduces the signal-to-noise ratio during the detection process. In addition, the substrate 13 absorbs heat especially during the writing process and thus laser energy must be wasted.

FIG. 4 illustrates a memory disc structure 40 which may be substituted for the disc 10 in the system of FIG. 1, but which overcomes the problems of the disc 10 caused by the imperfections of its substrate's surface 15. The memory disc 40 consists of a substrate 43, having a central hole 44 used for mounting on the turntable 11, and coated with two individual layers 42 and 46. The layer 46 is an intermediate layer which separates the substrate 43 and the outer thermoplastic layer 42. Since the layers 42 and 46 are most conveniently applied by a spin-coating process, the memory disc 40 is illustrated in the orientation required for the spin-coating, i.e., with substrate 43 on the bottom rather than the "upside-down" orientation required when used with the specific laser recording and reading mechanism of FIG. 1.

Figure 6:
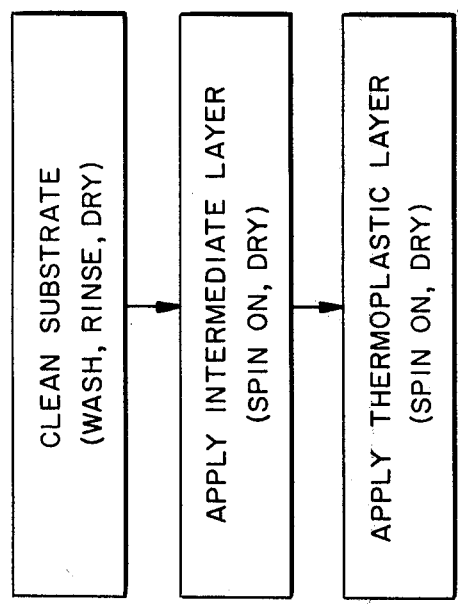
FIG. 6 is a flow chart illustrating the method for making the structure of FIG. 4.

The disc 40 is fabricated in accordance with the process shown in the flow chart of FIG. 6. The substrate 43 is, for example, an aluminum or aluminum alloy disc having a non-polished surface and may be a standard product such as the aluminum alloy discs marketed by Alcoa and designated 5086 and 5052. The disc's useful surface 45 needs no polishing, but care should be taken that it is free of oil, grease, and other surface impurities. Standard cleaning procedures may be used to eliminate these impurities. For example, oil and grease should be removed by washing the surface with an acetone reagent and other surface contamination may be removed by a solution of Alconox, a registered trademark of Alconox Inc., New York, N.Y., and water. These cleaning agents should then be removed by rinsing thoroughly with deionized water, and the cleaned surface 45 is then spun at a slow speed such as 200 rpm to dry it.

Figure 5:
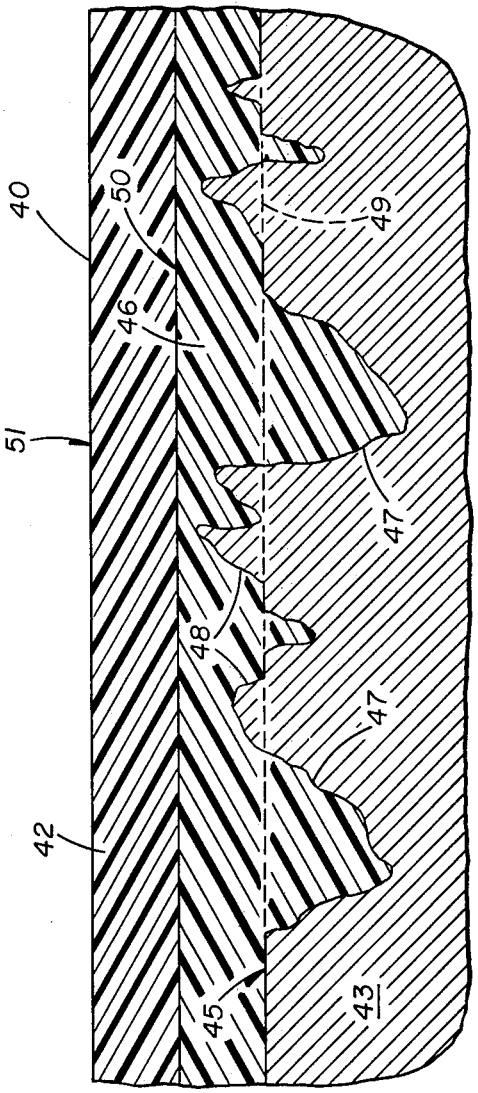
FIG. 5 is a greatly enlarged portion of the storage structure of FIG. 4 showing the interfaces between the layers of the structure.

The surface 45 contains microscopic variations such as those shown in FIG. 5 which is an enlarged cross-section of disc 40 in FIG. 4. For example, depressions 47 into the substrate 43 and protrusions 48 extending upward from the mean surface level 49 are distributed randomly over the surface 45. As indicated in FIG. 6, after cleaning the substrate 43, the next step is to apply a nonconformal intermediate layer 46 to the cleaned surface 45 in order to eliminate the effects of these varitions. This intermediate layer is applied by spin coating an appropriate polyurethane or other polymer material in a liquid state onto the surface 45. This procedure takes place with the substrate 40 positioned so that the surface 45 is facing upward as in FIG. 4. During the spin coating, the nonconformal layer 46 flows into the depressions 47 filling them and forming an essentially flat intermediary surface 50 parallel to and displaced from the mean level 49. The protrusions 48 vary in height; but for the Alcoa discs described above, the maximum height is approximately 0.2 mils (0.005 mm) and therefore for those discs, if the nonconformal layer 46 is applied to a height equal to or greater than this 0.2 mils an essentially smooth intermediate surface 50 is provided. Of course, for substrate materials having protrusions of greater height from the mean level 49, the nonconformal layer 46 may be made thicker, but a minimum of 0.2 mils has been found generally necessary.

The material which forms the layer 46 may be any thermosetting polymer material which may be spun-on, and sets up rapidly to form a nonconformal layer over a microscopically rough surface. As used herein, a thermosetting polymer is a polymer which, when cured, is insoluble and has a melting point high relative to the heat produced during operation of the system.

One such material is a composition of 40% by weight polyurethane in a xylene solvent. This compound is marketed by Candy and Co. (designated 12400). An alternative material is marketed by Thiokol/Chemical Division, Trenton, N.J., under the trademark Thiokol ZL-736. ZL-736 is 35.0% weight polyurethane thermosetting lacquer in an organic solvent, which consists of 60% by weight methyl cellosolve (a trademark of Union Carbide Corp.), 16% by weight toluene, and 24% by weight methanol. Another polyurethane composition which may be substituted is a composition of 66.6% by weight polyisocyanate (moisture cure prepolymer) marketed by Mobay Chemical Company (Division of Baychem Corp., Pittsburgh, Pa.) as Desmodur E21, the trademark of Farhenfabrihen Bayer GmbH, and 33.3% by weight cellosolve acetate as a solvent. In addition, epoxies, polyvinyl formals and other materials are suitable thermosetting polymers.

The coating material is prepared in liquid state for application in accordance with manufacturer's instructions. The cleaned and dried substrate 43 is rotated at a slow speed such as 200 rpm. The liquid coating material is then poured on at the innermost portion of the surface 45 being coated. This is followed almost immediately by a very rapid acceleration to a much higher spin-out rate, such as 800 to 1,000 rpm, which causes the material to spread out over the surface 45 to the periphery of the disc. The above-named materials all set up very rapidly as they are spread so that only a few seconds of rotation at the high spin-out rate is required to cause the material to form the layer 46 completely coating the disc 40. Then the speed is decreased to the slow speed and maintained at that level for about five minutes during which time initial drying takes place. The coating is then air dried for approximately 24 hours to form the fully cured intermediate coating layer 46. The thickness can be controlled by selection of the spin-out rate and the amount of liquid coating material will, of course, depend upon the size of the disc and the selected thickness. It is noted that the spin-coating process is preferably done in a clean environment to prevent contamination.

After layer 46 is completely cured, the next step is the application of the conformal layer 42 of thermoplastic material. Since it is applied to the fully cured intermediate layer 46 the upper surface 50 of which is free from microscopic variations, it will yield a microscopically smooth upper surface 51 which will be suitable for laser writing. This layer is applied to the smooth surface 50 using the same spin-on, spin-out, spin-dry and air dry procedure used in the application of the nonconformal layer 46. This thermoplastic material may be an acrylic resin or other appropriate composition, and one specific example is a composition of 49.4% by weight lacquer (marketed by E. I. duPont as number 1202) and 49.4% by weight diacetone alcohol as solvent plus a 1.2% by weight Brilliant Green dye. Of course, any composition which, when cured, produces a medium in which detectable grooves are produced by available laser radiation will be adequate. The Brilliant Green dye is used to enhance the energy absorption of the thermoplastic material for helium-neon laser radiation in particular, and other dyes can be substituted for other sources of writing energy.

Since the intermediate surface 50 is essentially smooth and free of the microscopic variations present in the substrate surface 45, the conformal thermoplastic layer 42 on top of the intermediate surface 50 will likewise be without microscopic variations on its surface 51. The smooth surface 51 offers no radical changes in the depth of the laser beam focal point so that writing is of greater accuracy than with prior art media. Similarly, since the surface surrounding the grooves and lands is essentially free of surface imperfections, the background scatter during illumination with a low intensity laser (reading mode) is very low and the signal-to-noise ratio at a detector, such as 33 in FIG. 1, is greatly improved over that possible with prior art discs.

The intermediary layer 46 also appears to provide insulation between the substrate and the thermoplastic. It has been found that this insulation reduces the heat dissipation into the substrate 43 and accordingly, the use of the intermediary layer serves to provide another advantage—that of reducing the laser energy required to provide adequate quality writing.

An alternative thermoplastic material, which exhibits an efflorescent quality when irradiated to form grooves, may be substituted for the aforementioned material. For example, a material, such as polyacrylamide, marketed as MC1400, MC1402 by Morton Chemical Co., or polyvinyl pyrrolidone, marketed under the trademark Ganex as Ganex P804, or Ganex P516 by GAF Corporation, will produce grooves when illuminated by any high intensity laser beam which creates a temperature above its glass transition temperature, $T_g$, but unlike the conventional thermoplastics, the interior surfaces of the grooves will exhibit a textured topography. This textured surface will, of course, enhance detection (increased signal-to-noise ratio) during the reading process and may therefore be preferred in certain applications.

The description of the memory storage medium has been limited to the disc type structure, but it should be clearly understood that other substrate structures, such as drums, tapes, ribbons, etc. are contemplated to be within the scope of the invention. In addition, numerous and varied other arrangements in accordance with these principles may readily be devised by those skilled in the art without departing from the spirit and scope of the invention.

What is claimed is:

1. A method of producing a thermoplastic memory structure comprising:
   cleaning a substrate;
   spinning the substrate;
   depositing a liquid thermosetting polyurethane polymer at the center of the spinning substrate and spinning the substrate at an increased rate whereby to spread and to effect a smooth surfaced nonconformal layer of said polymer;
   spinning the coated substrate at a reduced rate during which said layer is dried;
   curing said nonconformal layer;
   spinning said cured-layered substrate;
   depositing a liquid thermoplastic polyurethane polymer at the center of the spinning cured-layered substrate and increasing the rate of spin whereby to spread the thermoplastic polymer and effect a microscopically smooth conformal layer;
   spinning the now plural coated substrate at a reduced rate during which said conformal layer is dried; and
   curing said conformal layer.

* * * * *